Sept. 2, 1969     J. W. DEICHERT ET AL     3,464,178
COMPOSITE FLOOR STRUCTURE - METHOD OF INSTALLATION
Filed June 8, 1965
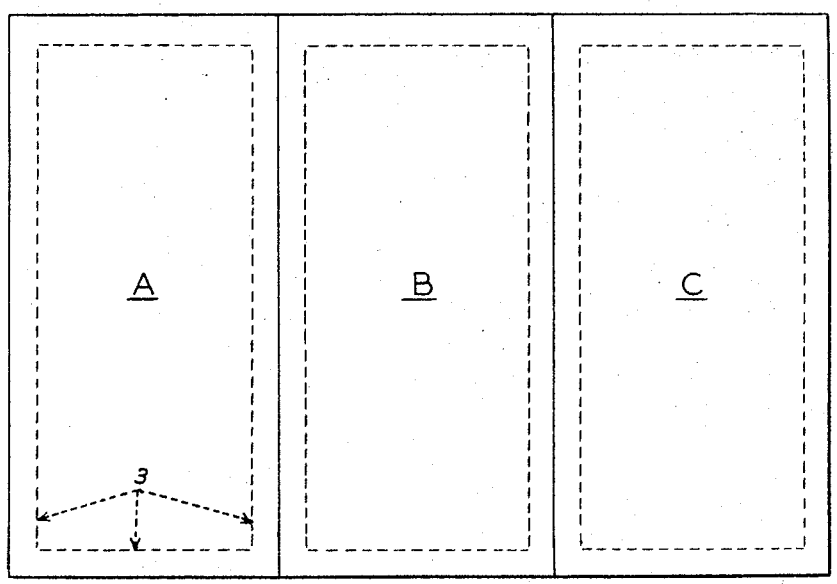
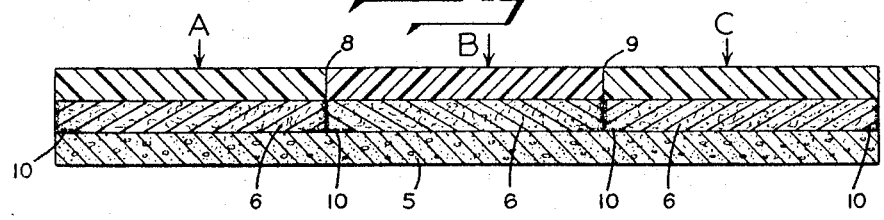
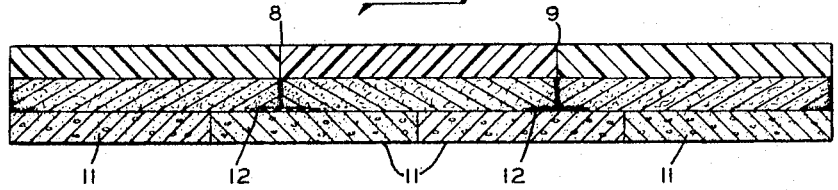
INVENTOR
JAMES W. DEICHERT
RICHARD J. EVANS
BY
ATTORNEY

United States Patent Office 3,464,178
Patented Sept. 2, 1969

3,464,178
COMPOSITE FLOOR STRUCTURE—METHOD OF INSTALLATION
James W. Deichert, Rohrerstown, and Richard J. Evans, Millersville, Pa., assignors to Armstrong Cork Company, Lancaster, Pa., a corporation of Pennsylvania
Filed June 8, 1965, Ser. No. 462,292
Int. Cl. E04c 1/00
U.S. Cl. 52—309                                2 Claims

ABSTRACT OF THE DISCLOSURE

An installation procedure for resilient sheet flooring having a porous backing layer and a thermoplastic resin containing decorative wear layer which shrinks in both machine and across-machine direction. The steps of the procedure include bonding the porous backing layer of sheet flooring to the subfloor at the perimeter of the room and to each other, at the seams formed by adjacent sheets, using an adhesive which forms a permanent irreversible bond under the conditions of room use.

---

This invention relates generally to a method for installing thermoplastic vinyl resin-containing decorative sheet floor coverings having a porous backing and to the composite floors thus formed. It is concerned with installation of such floor products over both rigid subflooring such as monolithic cement floors, i.e. cement slab construction, and with installations where the subfloor is formed of a plurality of sections which may be subject to movement such as subfloors formed from plywood panels or where the flooring may be installed directly over an old resilient floor such as tile, linoleum, or sheet vinyl.

It has been found that porous-backed thermoplastic vinyl resin-containing decorative sheet floor coverings are sufficiently unstable dimensionally so that installation of such sheet flooring materials in accordance with customary techniques has certain drawbacks which may be more or less pronounced depending upon the particular conditions prevalent in a given installation. We are particularly concerned with sheet flooring installations wherein, after installation, unsightly seam openings of the flooring or shrinkage of the floor around the perimeter of a room may develop.

It has become quite apparent that there are an infinite number of variables which affect the dimensional stability of commercial thermoplastic vinyl resin-containing decorative sheet floor coverings, especially those provided with porous backings which act to retain stresses built into the thermoplastic wear layer. A partial list of variables which affect stresses in the porous-backed thermoplastic wear layer includes the physical stresses imparted during production of the original backing utilized on such flooring, the application of key coats to the felt or other porous backing, changes in speed, tension, and temperatures in the production of the thermoplastic vinyl resin-containing decorative wear layers and their consolidation onto the backing, the rolling and rerolling of the finished goods and the time, temperature, and humidity conditions at which the finished rolls are stored. Surprisingly, tests made on such floor products have disclosed that such flooring exhibits a marked tendency to shrink, regardless of storage times and conditions, in both the machine and across-machine directions after installation. If such shrinkage could be restrained, the problems attendant in present installations, both commercial and non-commercial, could be obviated to a considerable degree.

Accordingly, the primary object of this invention is to provide a method whereby porous-backed thermoplastic vinyl resin-containing decorative sheet floor coverings may be successfully installed and wherein the installations will exhibit minimum seam openings as well as minimum wrinkling or buckling of the decorative thermoplastic vinyl resin-containing wear layer.

An ancillary object of this invention is to provide a method for installing such plastic sheet floor covering over subflooring which may have a tendency to move, so that the plastic sheet flooring is divorced from such subfloor movements.

These and other objects of this invention will appear from the following description when taken in connection with the accompanying drawings in which:

FIGURE 1 is a diagrammatic view illustrating a resilient floor installation formed of three separate sheets of porous-backed resilient floor covering having a decorative wear layer formed from a vinyl resin composition;

FIGURE 2 is a cross-sectional view along line 1—1 of FIGURE 1; and

FIGURE 3 is a cross-sectional view similar to FIGURE 2 except that the subfloor is formed of several segments, all of which are subject to movement.

In accordance with our invention we have found that thermoplastic vinyl resin, containing decorative sheet floor coverings having porous backings may be successfully installed in a room on both substantially rigid monolithic subfloors, such as, for instance, cement slab subfloorings, and on subfloors made up of a plurality of separate sections, by adhesively securing the porous backing of the plastic sheet flooring to the subfloor substrate at the perimeter of the porous backing layer. At the seams sufficient adhesive is used to form a bead at least to the top of the porous backing layer. Where the plastic sheet floor coverings are installed over subfloors which are subject to movement, it has been found that successful installations may be achieved by adhesively securing the felt backing around the perimeter of the floor being covered in a direct bond to the subfloor and, at the seams, the adhesive is applied either directly over the subfloor or over an impervious membrane such as a masking tape which thus isolates the plastic sheet flooring from the subfloor except at the room perimeter.

In practicing this invention the adhesive, which is selected to form a permanent bond under the conditions of flooring use such as a heat-setting or otherwise irreversible adhesive composition, is applied in a band around the perimeter of the room and, at the seams, in a swath which is spread on the subfloor such as a cement slab or board underlayment, depending on the construction, directly under the area in which the seam will fall. On installation, excess adhesive is forced up as a bead at the seam and thus joins adjacent sheets to form a substantially monolithic sheet floor. Continuity of the porous backing is thus achieved and the resulting sheet possesses excellent tensile strength. The adhesive is absorbed by the backing to some extent before setting. By this method of installation the decorative thermoplastic wear layer is held under restraint and remains both buckle- and wrinkle-free after installation.

Referring to the drawings in detail, the method of installation and the floorings produced in accordance with this invention are more fully illustrated in FIGURES 1, 2 and 3. FIGURES 1 and 2 illustrate a floor which has a monolithic cement slab subfloor 5 to which is adhesively bonded a plurality of sheets A, B and C, each of which is formed of felt-backed thermoplastic vinyl resin-containing decorative floor covering having a plastic wear layer 7 and felt backing 6. As shown in FIGURE 2 adjacent sheets of floor covering are bonded to each other through the felt backing at seams 8 and 9 and are adhesively secured to the cement slab subfloor 5 by means of an adhesive bonding layer between the subfloor and the felt backing at the perimeters of the sheets. The shaded area illustrates the extent to which the adhesive is absorbed by the porous backing 6. The adhesive is illustrated by the numeral 10. In FIGURE 1, the adhesive layer is delineated by the dotted lines 3 and by the room boundaries.

FIGURE 3 illustrates a second embodiment of applicants' invention in which the subfloor is comprised of a series of individual floor board underlayments, designated by the numeral 11, which form the subfloor. In this embodiment plastic sheet floor coverings A, B and C are adhesively secured at the periphery of the sheets to the subfloor by means of an adhesive layer 10 which bonds the felt backing to the slabs at the points illustrated and, where the sheets abut to form seams 8 and 9, an impervious masking tape 12 is utilized to isolate the subfloor from the adhesive which is utilized to form a bond between the adjacent abutting felt layers of sheets A, B and C. In this embodiment the resultant decorative wearing surface is divorced from any subfloor movement which may take place beneath the felt-backed decorative plastic surface covering except where a direct bond has been made at the perimeter of the room.

The following is an example of a suitable adhesive for use in the practice of this invention:

| Ingredient | parts by weight |
| --- | --- |
| Condensation product of epichlorohydrin and bisphenol-A having a kinematic viscosity of 125 poises at 25° C. (A.S.T.M. D445–53T) and an epoxide equivalent of 185 | 70 |
| Fine particle size silica | 5 |
| Condensation product of dilinoleic acid and diethylene triamine having an amine value of 330 and a Brookfield viscosity of 500 poises at 25° C. (Brookfield viscometer Model #RVF, #3 Spindle, 20 r.p.m.) | 30 |

The several ingredients are mixed just prior to installing the floor as the epoxide resin and amide hardener react on standing to form an irreversible thermoset adhesive. Other adhesives may be used although they must form a permanent bond under conditions of floor use. Thus water-soluble adhesives must not be used if the floor is on or below grade and subject to moisture conditions. Also if the flooring is installed in an industrial area where solvents might well be used it would not be advisable to use a solvent-sentitive adhesive composition.

In installing floors in accordance with this invention, a swath or the epoxy adhesive thickened with fine particle silica is spread on the subfloor of the room directly under the area in which the perimeter of the felt-backed thermoplastic vinyl resin-containing decorative floor covering will fall and under the area in which will fall the seam. In laying two successive sheets of flooring, the first piece of sheet flooring is laid and straight edged and then the second piece is laid, undescribed, and rolled down. Excess epoxy in the seam area is forced up through the seam and is wiped from the face of the goods before it cures. After the epoxy has cured, continuity of the felt backing layer is effected and the resulting sheet possesses excellent tensile strength. In addition, the felt backing bond achieved presents an excellent flooring to subfloor bond. In the adhesive composition illustrated the silica is used to form a more viscous mass, which, although it does not readily flow from the bond area, is absorbed by the porous backing.

In an installation of this type, the porous-backed sheet plastic flooring, which shrinks both in machine and across-machine direction, on installation is held under restraint and buckle- and wrinkle-free. Even when the subfloor is subject to some movement, as for instance where a wood underlayment is used which is subject to some swelling or contraction dependent on moisture conditions, the flooring remains under restraint and the forces set up by underlayment movement are taken up over the whole area of a given sheet.

Although the invention has been illustrated by the use of a felt-backed decorative plastic sheet floor covering, it will be readily evident that other porous backings such as open cell foams could be used.

Compared with current methods of installation, in which the use of both thermoplastic and thermoset adhesives over the entirety of the floor area is the customary practice, of the present invention results in case of installation and, additionally, ease of replacement.

We claim:

1. The method for adhesively securing a decorative floor covering over the subfloor of a room wherein the decorative floor covering is comprised of a plurality of sheets having a thermoplastic vinyl resin-containing wear layer which shrinks in both machine and across machine direction bonded to a porous backing layer, the improvement consisting essentially of positioning an impervious membrane under the seams formed by adjacent sheets between the subfloor and the porous backing layer and adhesively securing the porous backing of said sheets to the subfloor at the perimeter of the room and to each other and to the impervious membrane at the seams formed by adjacent sheets by means of an adhesive composition which forms an irreversible bond under the conditions of room use so that said decorative floor covering is isolated against movement in the subfloor everywhere except at the perimeter of the room.

2. In a flooring installation for a room, in combination, a subfloor, a plurality of sheets comprised of a thermoplastic vinyl resin-containing decorative wear layer which shrinks in both machine and across machine direction bonded to a porous backing layer, an impervious membrane positioned under the seams formed by adjacent sheets between the subfloor and the porous backing and a permanent adhesive bond of a thermoset composition between said subfloor and said porous backing at the perimeter of the room and between the impervious membrane and the porous backing layers at the seams formed by adjacent sheets, said bond being irreversible under the conditions of room use, so that said decorative floor covering is isolated against movement in the subfloor everywhere except at the perimeter of the room.

References Cited

UNITED STATES PATENTS

| 3,001,902 | 9/1961 | Cooke et al. | 52—314 |
| 3,209,500 | 10/1965 | Bernett | 52—390 |
| 3,270,473 | 9/1966 | Smith | 52—390 |
| 3,300,927 | 1/1967 | Bettoli | 52—420 |

FOREIGN PATENTS

| 448,329 | 6/1936 | Great Britain. |
| 466,873 | 7/1950 | Canada. |

OTHER REFERENCES

Simplank Publication, Simkal Corporation, 30 Dyke Lane, Stamford, Conn., Sept. 12, 1962.

Architectural Record Publication, April, 1956, vol. 119, No. 4, p. 265.

FRANK L. ABBOTT, Primary Examiner

J. L. RIDGILL, JR., Assistant Examiner

U.S. Cl. X.R.

52—314, 390, 420, 746; 156—71; 161—38